United States Patent
Prasad et al.

(10) Patent No.: US 11,074,254 B2
(45) Date of Patent: Jul. 27, 2021

(54) PERFORMANCE MANAGEMENT USING THRESHOLDS FOR QUERIES OF A SERVICE FOR A DATABASE AS A SERVICE

(71) Applicant: International Business Machines Corporation, Armonk, NY (US)

(72) Inventors: Ramya Hari Hara Prasad, New York, NY (US); Girish Sundaram, Parsippany, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1351 days.

(21) Appl. No.: 15/077,987

(22) Filed: Mar. 23, 2016

(65) Prior Publication Data
US 2017/0278012 A1 Sep. 28, 2017

(51) Int. Cl.
*G06F 16/2453* (2019.01)
*H04L 29/08* (2006.01)
*H04L 12/26* (2006.01)
*G06N 20/00* (2019.01)
*H04L 12/24* (2006.01)

(52) U.S. Cl.
CPC ......... *G06F 16/2453* (2019.01); *G06N 20/00* (2019.01); *H04L 41/5003* (2013.01); *H04L 43/0852* (2013.01); *H04L 43/16* (2013.01); *H04L 67/1097* (2013.01)

(58) Field of Classification Search
CPC . G06N 20/00; H04L 41/5003; H04L 43/0852; H04L 43/16; H04L 67/1097
See application file for complete search history.

(56) References Cited

U.S. PATENT DOCUMENTS

| 6,760,722 B1 * | 7/2004 | Raghunandan ........ G06N 5/046 |
| 6,999,958 B2 | 2/2006 | Carlson et al. |
| 7,246,108 B2 | 7/2007 | Ahmed |

(Continued)

OTHER PUBLICATIONS

Silva et al.; "Querying Databases by Snapping Blocks", Data Engineering (ICDE), 2015 IEEE 31st International Conference On, Apr. 13-17, 2015, pp. 1472-1475.

(Continued)

*Primary Examiner* — Alexey Shmatov
*Assistant Examiner* — Robert Bejcek, II
(74) *Attorney, Agent, or Firm* — Samuel Waldbaum, Esq.; McGinn I.P. Law Group, PLLC.

(57) ABSTRACT

A performance management method, system, and non-transitory computer readable medium for a service for database as a service (DBaaS) in a cloud computing environment, include a receiving and comparing circuit configured to receive a service request from a user and compare the received service request to at least one prior received service request, a similarity calculating circuit configured to calculate a similarity between the service request and the at least one prior received service request based on a requirement that the service request places on the DBaaS, and a data verifying circuit configured to verify whether information within the database of the DBaaS has changed since an identical prior received service request based on the receiving and comparing circuit identifying the identical prior received service request.

15 Claims, 9 Drawing Sheets

(56) References Cited

U.S. PATENT DOCUMENTS

| | | |
|---|---|---|
| 7,395,537 B1 * | 7/2008 | Brown .................. G06F 16/217 |
| | | 718/104 |
| 7,739,263 B2 | 6/2010 | Das et al. |
| 7,809,713 B2 | 10/2010 | Su et al. |
| 8,429,151 B2 | 4/2013 | Nica et al. |
| 8,533,730 B2 | 9/2013 | Ito |
| 8,903,805 B2 | 12/2014 | Lee et al. |
| 9,128,984 B2 | 9/2015 | Wiener et al. |
| 2005/0240570 A1 * | 10/2005 | Ozbutun ............ G06F 16/24539 |
| 2006/0190430 A1 * | 8/2006 | Luo ....................... G06F 16/284 |
| 2008/0052719 A1 * | 2/2008 | Briscoe ............... H04L 41/0856 |
| | | 718/104 |
| 2009/0327495 A1 * | 12/2009 | Betts-Lacroix ......... H04L 67/10 |
| | | 709/226 |
| 2012/0226693 A1 | 9/2012 | Zhang et al. |
| 2015/0142762 A1 | 5/2015 | Konik et al. |
| 2015/0169684 A1 | 6/2015 | Li et al. |
| 2015/0339349 A1 | 11/2015 | Ahmed et al. |

OTHER PUBLICATIONS

Lang et al.; "Database Optimization for the Cloud: Where Costs, Partial Results, and Consumer Choice Meet", CIDR'15, 7th Biennial Conference On, Jan. 1-7, 2015, pp. 1-8.

Costa et al.; "Adaptive Query Processing in Cloud Database Systems", CGC'13, 2013 IEEE Third International Conference On, Sep. 30-Oct. 2, 2013, pp. 201-202.

* cited by examiner

DBAAS OPTIMIZATION SYSTEM 500

PERFORMANCE MANAGEMENT USING THRESHOLDS FOR QUERIES OF A SERVICE FOR A DATABASE AS A SERVICE

BACKGROUND

The present invention relates generally to a performance management system, and more particularly, but not by way of limitation, to a system improving performance of a query/service for database as a service (DBaaS) in a cloud computing environment.

DBaaS conventionally delivers database functionality similar to what is found in relational database management systems (RDBMSes) such as Structured Query Language (SQL) Server, MySQL and Oracle. Being cloud-based, on the other hand, DBaaS provides a flexible, scalable, on-demand platform that is oriented toward self-service and easy management, particularly in terms of provisioning a business' own environment. DBaaS products typically provide enough monitoring capabilities to track performance and usage and to alert users to potential issues. The products can also generate at least some degree of data analytics.

Conventionally, the DBaaS model has disadvantages which include a lack of control over network performance issues, such as unacceptable latency and application failures. Furthermore, some DBaaS products do not support capabilities of the typical RDBMS, such as data compression and table partitions. Before committing to DBaaS, it is essential to assess your specific requirements and ensure they are satisfactorily addressed. However, the back-end of the DBaaS (i.e., the database/server) is not efficiently managed to provide optimal query/service times.

Thus, there is a technical problem in that the conventional techniques that manage DBaaS systems do not optimally increase performance of a DBaaS.

SUMMARY

The inventors have considered a technical solution to the technical problem by deciding to make various thresholds in the service optimizer more aggressive (i.e., manage the cloud computing environment or the like) when the DBaaS in the cloud environment notes that a given QB/Service is running slower than normal. Thus, subsequent queries of the query/service requests may run faster, and the service request total runtime can be consistent with expectations. After the query/service request completes, the thresholds would return to normal, or could be saved to affect the thresholds of future query/service request.

In an exemplary embodiment, the present invention can provide a performance management system for a service for database as a service (DBaaS) in a cloud computing environment, the system including a receiving and comparing circuit configured to receive a service request from a user and compare the received service request to at least one prior received service request, a similarity calculating circuit configured to calculate a similarity between the service request and the at least one prior received service request based on a requirement that the service request places on the DBaaS, a data verifying circuit configured to verify whether information within the database of the DBaaS has changed since an identical prior received service request based on the receiving and comparing circuit identifying the identical prior received service request, an overlap determining circuit configured to determine an overlap between data of the service request and the identical prior received service request whether the data verifying circuit verifies the information within the database of the DBaaS has not changed, a service analyzing circuit configured to analyze the service request to determine if a threshold value of the database of the DBaaS should be updated based on if the service request will be completed in the cloud computing environment outside of an expected run time, and a database modifying circuit configured to modify the threshold value of the database of the DBaaS such that the service request is completed within the expected run time.

Further, in another exemplary embodiment, the present invention can provide a performance management method for a service for database as a service (DBaaS) in a cloud computing environment, the method including receiving a service request from a user, comparing the received service request to at least one prior received service request, calculating a similarity between the service request and the at least one prior service request based on a requirement that the service request places on the DBaaS, verifying whether information within the database of the DBaaS has changed since an identical prior received service request based on the comparing identifying the identical prior received service request, determining an overlap between data of the service request and the identical prior received service request if the verifying verifies that the information within the database of the DBaaS has not changed, analyzing the service request to determine if a threshold value of the database of the DBaaS should be updated based on whether the service request will be completed in the cloud computing environment outside of an expected run time, and modifying the threshold value of the database of the DBaaS such that the service request is completed within the expected run time.

Even further, in another exemplary embodiment, the present invention can provide a method for optimization of database as a service (DBaaS) of query blocks of a query block tree in a cloud database environment, the method including for a query block of interest that comprises part of a query block tree having a plurality of query blocks having at least one root query block in common, determining one or more subsequent query blocks having greater than a predetermined probability of being executed subsequent to execution of the query block, for the one or more subsequent query blocks having greater than the predetermined probability of being executed subsequent to execution of the query block, adjusting one or more operational threshold values of a plurality of resources to increase execution speed of subsequently executed service requests of the one or more subsequent query blocks so as to yield an expected run time of the one or more subsequent query blocks when executed that is faster than a default run time of the one or more subsequent query blocks if the one or more operation threshold values were not adjusted, executing the one or more subsequent query blocks in accordance with the adjusted one or more operational threshold values of the plurality of resources, capturing an actual run time of the one or more subsequent query blocks when executed, determining if the captured run time is less than or equal to a target run time, updating historical execution data of the one or more subsequent query blocks to generate an updated expected run time of the one or more subsequent query blocks in accordance with the adjusted one or more operation threshold values of the plurality of resources, and compiling the historical execution data of the one or more subsequent query blocks to generate the expected run time of the one or more subsequent query blocks of the query block tree.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
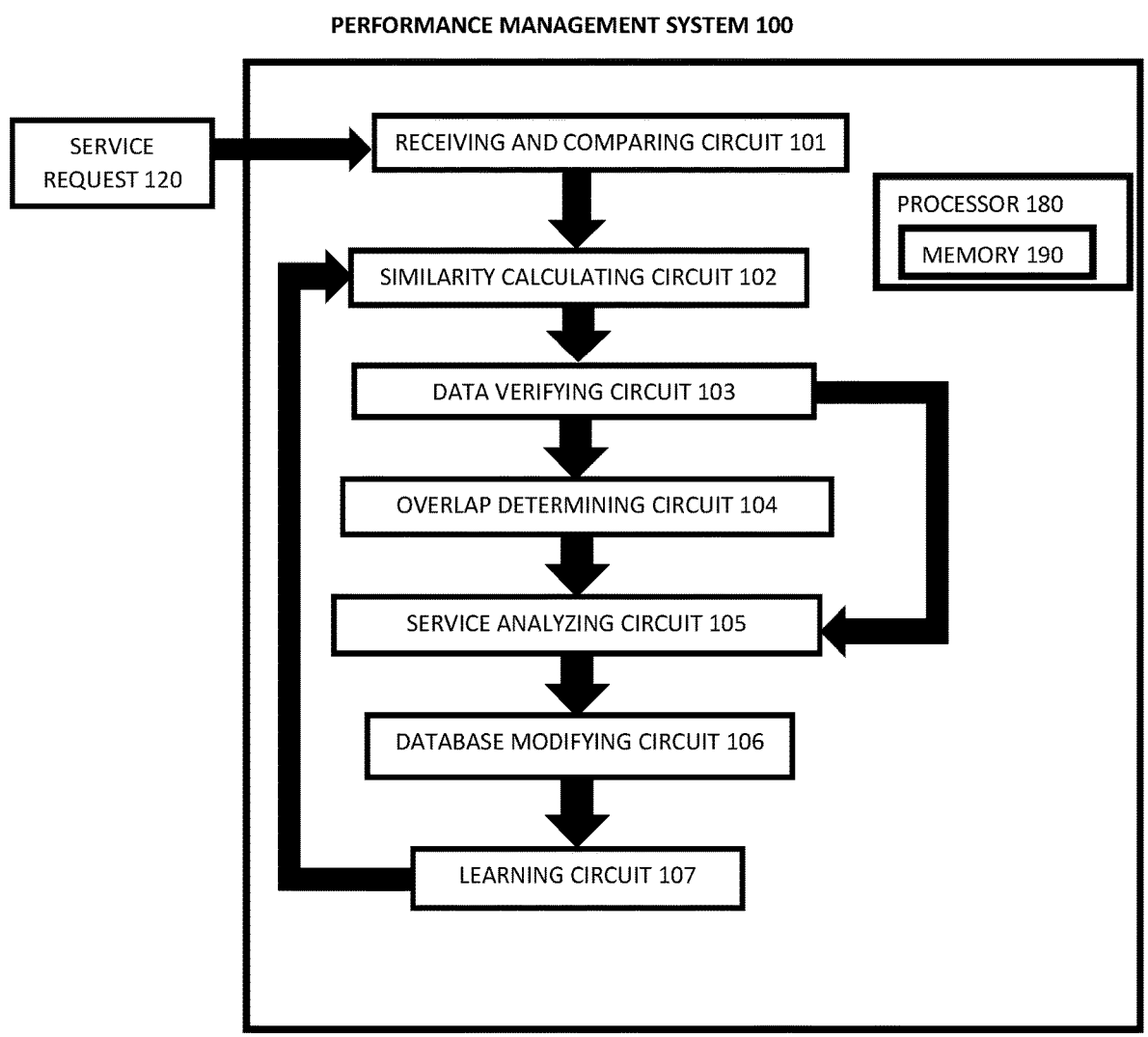
FIG. 1 exemplarily shows a block diagram illustrating a configuration of a performance management system 100.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the performance management system 100 includes a receiving and comparing circuit 101, a similarity calculating circuit 102, a data verifying circuit 103, an overlap determining circuit 104, a service analyzing circuit 105, a database modifying circuit 106, and a learning circuit 107. The performance management system 100 includes a processor 180 and a memory 190, with the memory 190 storing instructions to cause the processor 180 to execute each circuit of performance management system 100. The processor and memory may be physical hardware components, or a combination of hardware and software components.

Although the performance management system 100 includes various circuits, it should be noted that a performance management system can include modules in which the memory 190 stores instructions to cause the processor 180 to execute each module of performance management system 100.

Also, each circuit can be a stand-alone device, unit, module, etc. that can be interconnected to cooperatively produce a transformation to a result.

DBaaS is a cloud-based approach to the storage and management of structured data. It is noted that the performance management system 100 is specifically intended for a DBaaS environment on the cloud computing system. However, modifications and variations of the environment to apply the performance management system 100 will be apparent to those of ordinary skill in the art without departing from the scope and spirit of the described embodiments.

Further, the embodiments herein refer to query and service interchangeably and query/service means a request from a user on the front-end side to the database on the back-end side using the cloud environment.

Query Blocks (QB) are groups of queries/services which run together as a DBaaS. Often these QBs are denoted via commit begin/ends, but the QB could be queries or services in a given application or which run consistently adjacent to each other. Thus, the DBaaS in a cloud environment can note average and/or expected run times of given QBs.

With the use of these various circuits, the performance management system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and/or kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain "cognitive states". The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by further feature analysis of subgraphs, including dimensionality reduction of the subgraphs, for example by graphical analysis, which extracts topological features and categorizes the resultant subgraph and its associated feature nodes and edges within a subgraph feature space.

Figure 7:
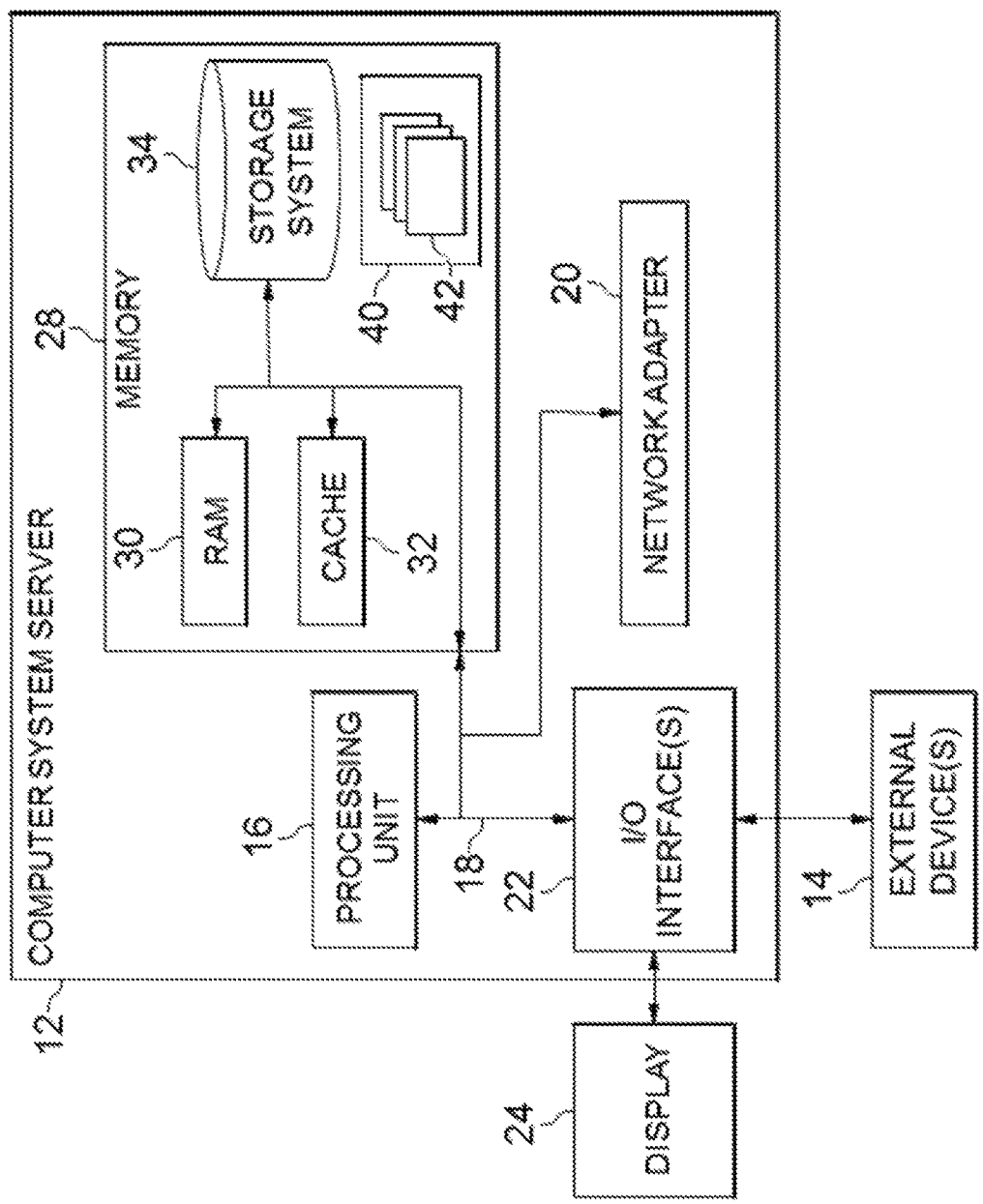
FIG. 7 depicts a cloud computing node 10 according to an embodiment of the present invention.
Figure 8:
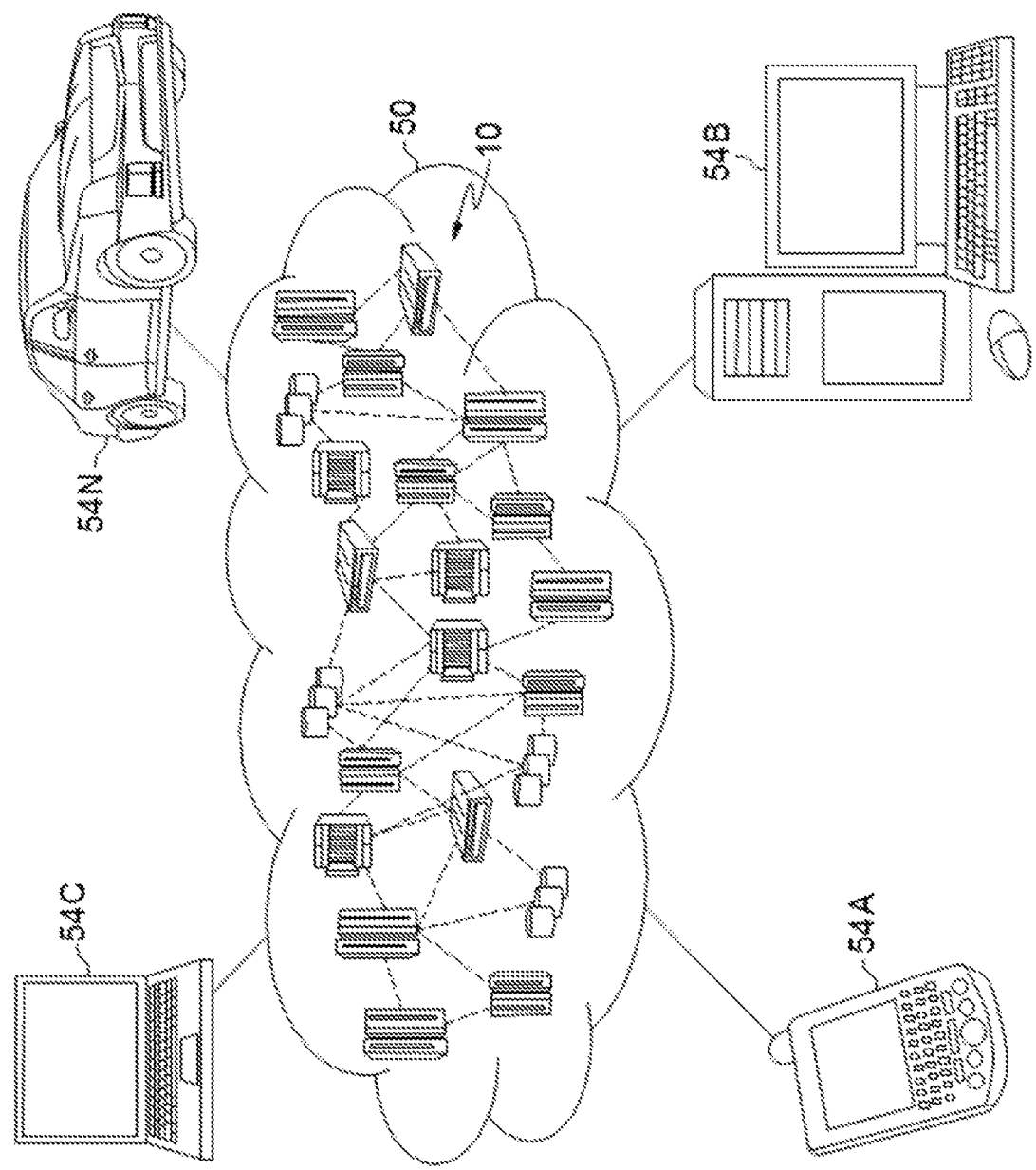
FIG. 8 depicts a cloud computing environment 50 according to another embodiment of the present invention.
Figure 9:
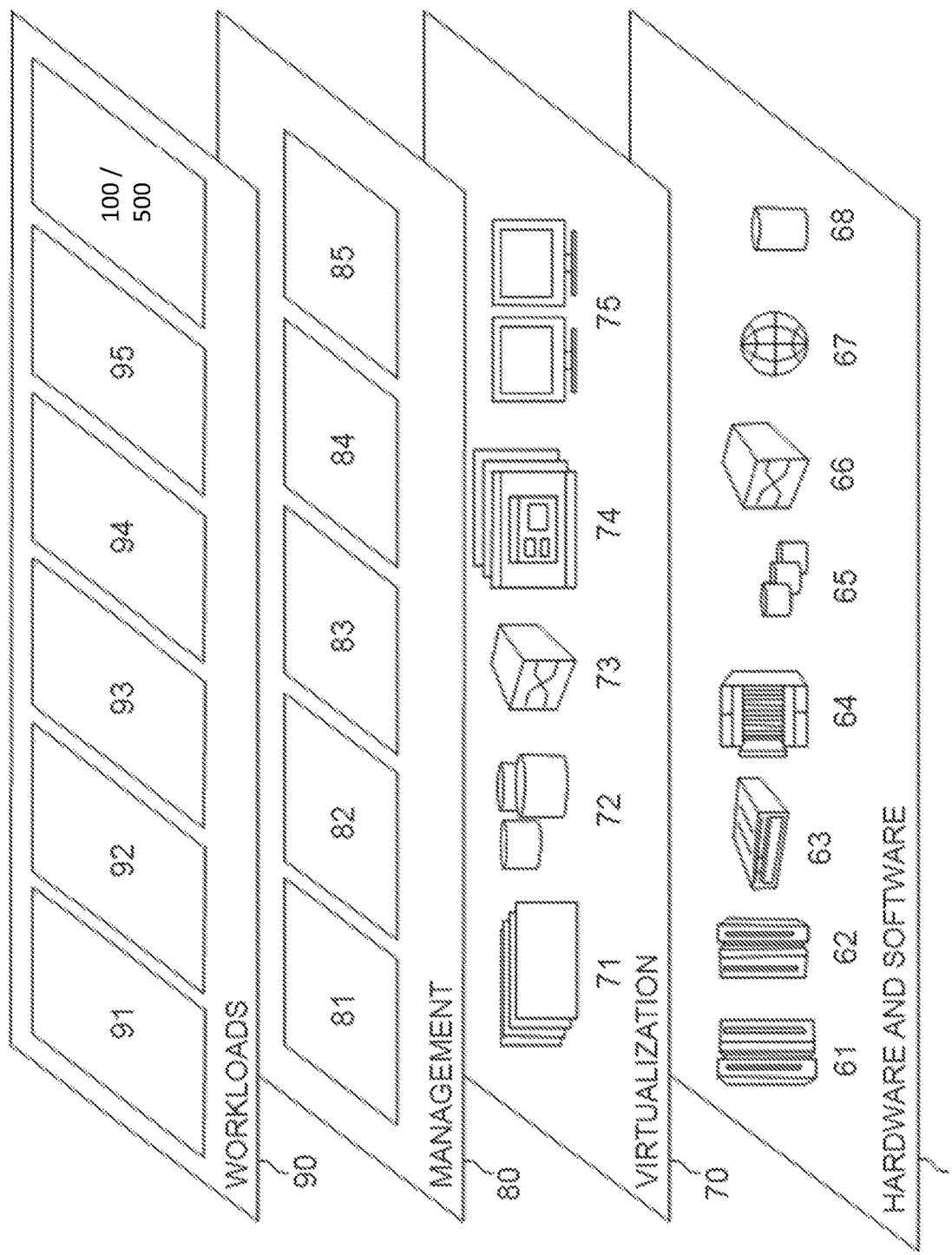
FIG. 9 depicts abstraction model layers according to an embodiment of the present invention.

Although as shown in FIGS. 7-9 and as described later, the computer system/server 12 is exemplarily shown in cloud computing node 10 as a general-purpose computing circuit which may execute in a layer the performance management system 100 (FIG. 9), it is noted that the present invention can be implemented outside of the cloud environment.

The receiving and comparing circuit 101 receives a service request 120 from a user. The receiving and comparing circuit 101 compares the received service request 120 to prior received server requests 120 to determine if a same service request 120 has been submitted in a prior request.

For example, if the database on the cloud environment includes an employee chart and the current service request 120 is for all engineers and all machinists, the receiving and comparing circuit 101 compares the current service request 120 with each prior service request 120 to find a same request. Thus, if a prior service request 120 was for engineers and welders, the receiving and comparing circuit 101 identifies that the current service request 120 has been submitted before.

The similarity calculating circuit 102 calculates a similarity between the current service request 120 and prior service requests 120 based on requirements that the search places on the DBaaS. The requirements can include, but not limited to, a similar runtime to complete the service request 120, a percentage of memory used, if a temporary sparse index is needed, amount of processor parallelism to be used, length of time slice to be used, if the service request 120 can cause an increase of task priority, if the service request 120 requires Local Predicate Generation (LPG), or the like. That is, the similarity calculation circuit 102 predicts a type of load that the service request 120 will cause to the DBaaS based on similar prior service requests 120. The similarity calculating circuit 102 interacting with the learning circuit 107 will be described in detail later.

The data verifying circuit 103 verifies if the information within the database has changed since the last request 120 that has the same information requested. For example, if the database has not been updated since the prior service request 120 was submitted, the performance management system 100 will signal for the overlap determining circuit 104 to determine an overlap between the data in the database of the current request 120 and that of the prior request 120 that requested the same data. Therefore, in the example request given above, the overlap determining circuit 104 will determine that the engineers overlap in both requests and thus avoid a new search of the database (i.e., improve efficiency of the service request 120 to the DBaaS by limiting the read data from the database).

If the data has been updated since the prior service request 120 was submitted, the performance management system 100 will bypass the overlap determining circuit 103 and the service analyzing circuit 105 analyzes the service request 120 to the determine if the service request 120 will be completed within the expected run time. In other words, the service analyzing circuit 105 analyzes if a service request 120 is running slower than expected/normal and communicates that a threshold value needs to be modified by the database modifying circuit 106 in order to complete the service request 120 in the expected time.

Figure 3:
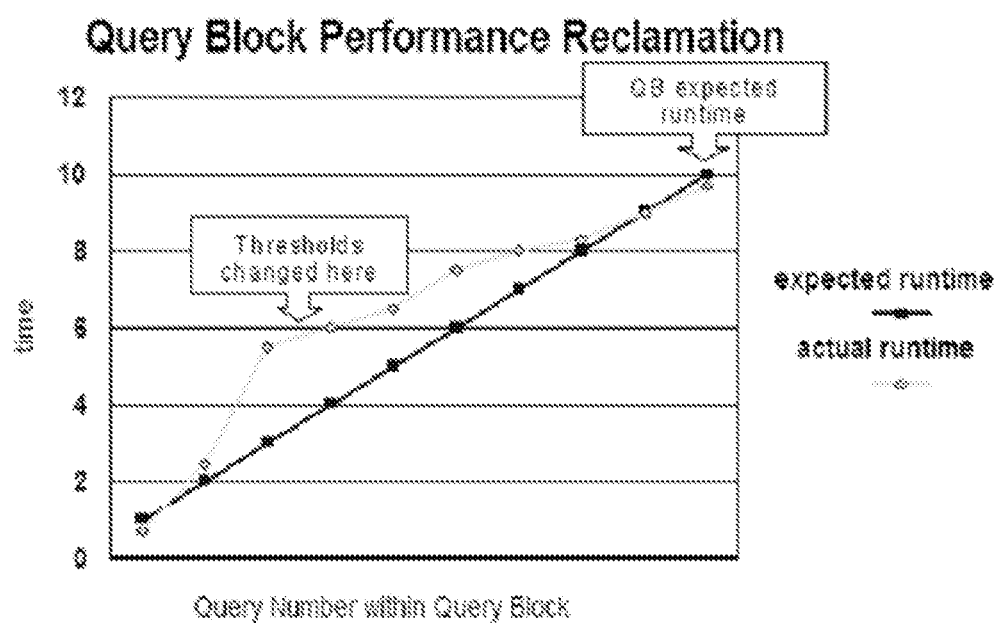
FIG. 3 exemplarily shows a query block performance reclamation.

For example, as shown in exemplary FIG. 3, if the service request 120 includes ten sub-service requests, and the service analyzing circuit 105 determines that 50% of the allotted time has been used after the third sub-service request is completed, the service analyzing circuit 105 will signal to the database modifying circuit 106 that a threshold value for the sub-service requests four through ten need to be updated to finish the service request 120 within the expected time.

Based on the service analyzing circuit 105 determining that a threshold value within the database needs to be changed in order to complete the service request 120 in the expected time, the database modifying circuit 106 modifies the thresholds for the sub-service requests (i.e., four through ten in the above example) so that the service request 120 is completed within the allotted time. The thresholds modified by the database modifying circuit 106 include, but not limited to, a threshold of when to create a temporary sparse index for the service request 120, a threshold of the percentage of memory used that will trigger getting more memory for the service request 120, a threshold of amount of processor parallelism to be used for the service request 120, a threshold of length of time slice to be used for the service request 120, a threshold of when to increase task priority for the service request 120, a threshold of when to use real time statistics for the service request 120, a threshold of when to kick in Local Predicate Generation (LPG) for the service request 120, and other thresholds relating to when to allocate additional resources to speed up or optimize the service request 120.

Once the service request 120 is completed within the expected time after the thresholds have been updated to optimize the service request 120, the resources to modify the thresholds can be freed immediately by shifting the optimizer thresholds back to default levels. Such an operation causes the resources to be shifted to other service requests 120 whether or not they are further needed. Alternatively to switching back to default thresholds, the service request 120 thresholds are passed to subsequent service requests, or saved for future runs of that specific service requests via the learning circuit 107.

The learning circuit 107 learns the threshold modifications by the database modifying circuit 106 and submits the threshold modifications to the similarity calculating circuit 102. Thus, the similarity calculating circuit 102 calculates a similarity between the current service request 120 and the prior service requests 120 such that a similar threshold modification can be performed by the database modifying circuit 106 based on a degree of similarity between the service requests 120 from learned modifications which allow the service request 120 to be completed within the expected time.

For example, even if the data being requested in the service request 120 from the DBaaS is completely different from all prior service requests 120, the similarity calculating circuit 102 can calculate that the current service request 120 will require a similar modification in threshold values to finish the service request 120 within the expected time. Therefore, the database modifying circuit 106 will modify the current service request 120 to use a "learned" threshold modification based on the calculated similarity between a prior service request 120 and the current service request 120.

Thus, by the learning circuit 107, the similarity circuit 102, and the modification circuit 106 interacting in the above manner, the performance management system 100 can intelligently determine what constitutes a block of service requests 120 using various criteria.

One example is for a commit cycle, in which the system 100 can keep a record of service requests 120 between one commit and the next commit. Another example is for an application, in which the system 100 can keep a record of contiguous service requests 120 against the same table(s) with less than a second between each sub-service request 120. For example, when a pattern is repeated three or more times for a group of service requests 120, then a signature will be saved for that query block by the learning circuit 107. When that signature is seen in the future it (i.e., a similarity is calculated by the similarity calculation circuit 102), the system 100 can recognize the query block even after just one query in the block. If a subsequent service request 120 in the block diverges from the signature, then the system 100 can revert back to the non-block scenario with no change in current support.

Further, it is noted that the receiving and comparing circuit 101 compares the current service request 120 to prior service requests 120 to determine if an identical service request, even if partial, has been performed such that the same data can be used without having to use processing power of the DBaaS. The similarity calculating circuit 102 is different than the receiving and comparing circuit 101 in that the similarity calculating circuit 102 calculates a similarity between the current service request 120 and prior service requests 120 based on requirements that the search places on the DBaaS. Thus, the similarity calculating circuit 102 can determine a similarity between the current service request 120 and prior service requests 120 even if the data requested is completely different.

Figure 2:
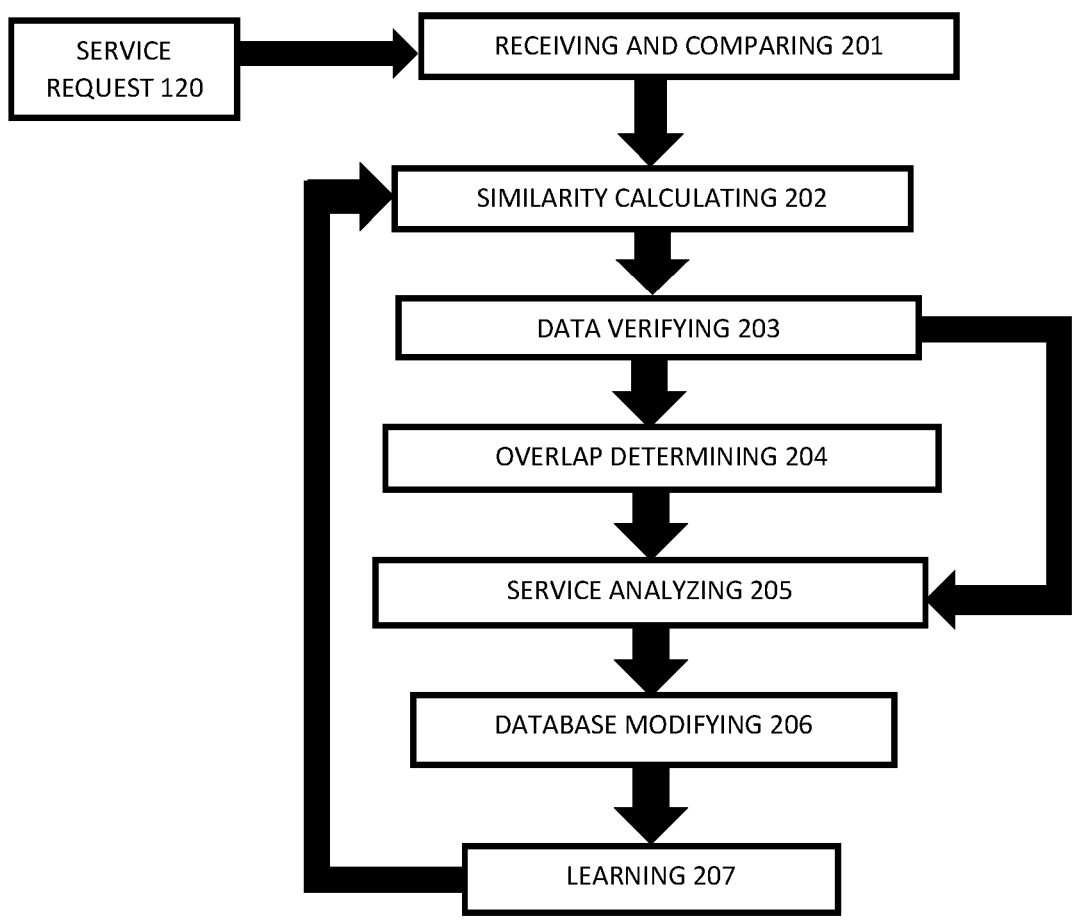
FIG. 2 exemplarily shows a high level flow chart for a performance management method 200.

FIG. 2 shows a high level flow chart for a performance management method 20.

Step 201 receives a service request 120 from a user and compares the received service request 120 to prior received server requests 120 to determine if a same service request 120 has been submitted in a prior request.

Step 202 calculates a similarity between the current service request 120 and prior service requests 120 based on requirements that the search places on the DBaaS.

Step 203 verifies if the information within the database has changed since the last request 120 that had the same information requested.

If the data has not changed as determined by Step 203, Step 204 determines an overlap between the data in the database of the current request 120 and the prior request 120 that requested the same data.

After Step 204 or if Step 203 determines that the data has changed and skips step 204, Step 205 analyzes the service request 120 to the determine if the service request 120 will be completed within the expected run time.

Based on Step 205 determining that a threshold value within the database needs to be changed in order to complete the service request 120 in the expected time, Step 206 modifies the thresholds so that the service request 120 is completed within the allotted time.

Step 207 learns the threshold modifications by Step 206 and submits the threshold modifications to Step 202 such that Step 202 can calculate a similarity between the current service request 120 and prior service requests 120 to predict a threshold modification needed.

Figure 4:
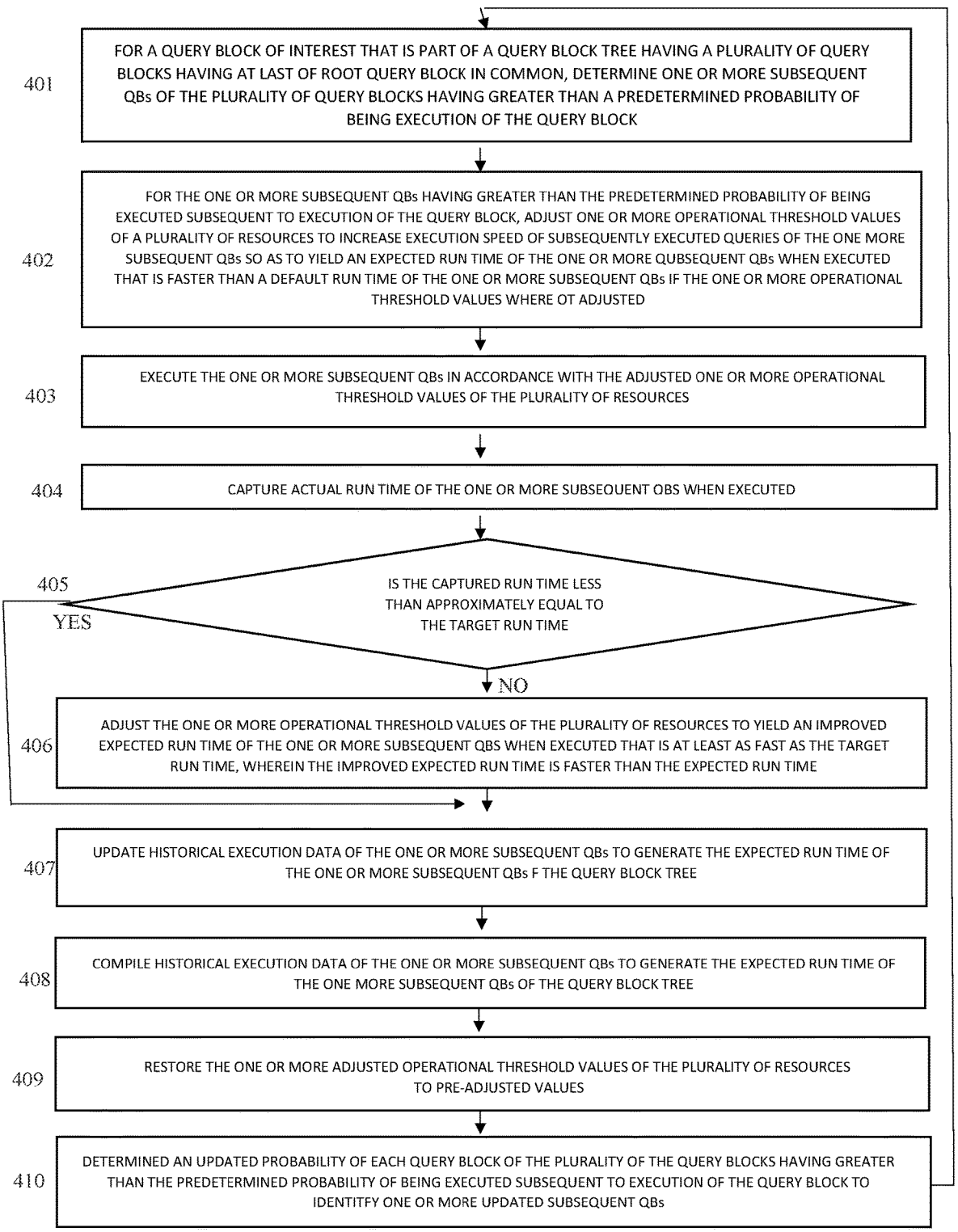
FIG. 4 exemplarily shows a high level flow chart for a method 400 of optimization of database as a service queries of query blocks of a query block tree in a cloud database environment FIG. 5 exemplarily shows a block diagram illustrating a configuration of a DBAAS optimization system 500.
Figure 5:
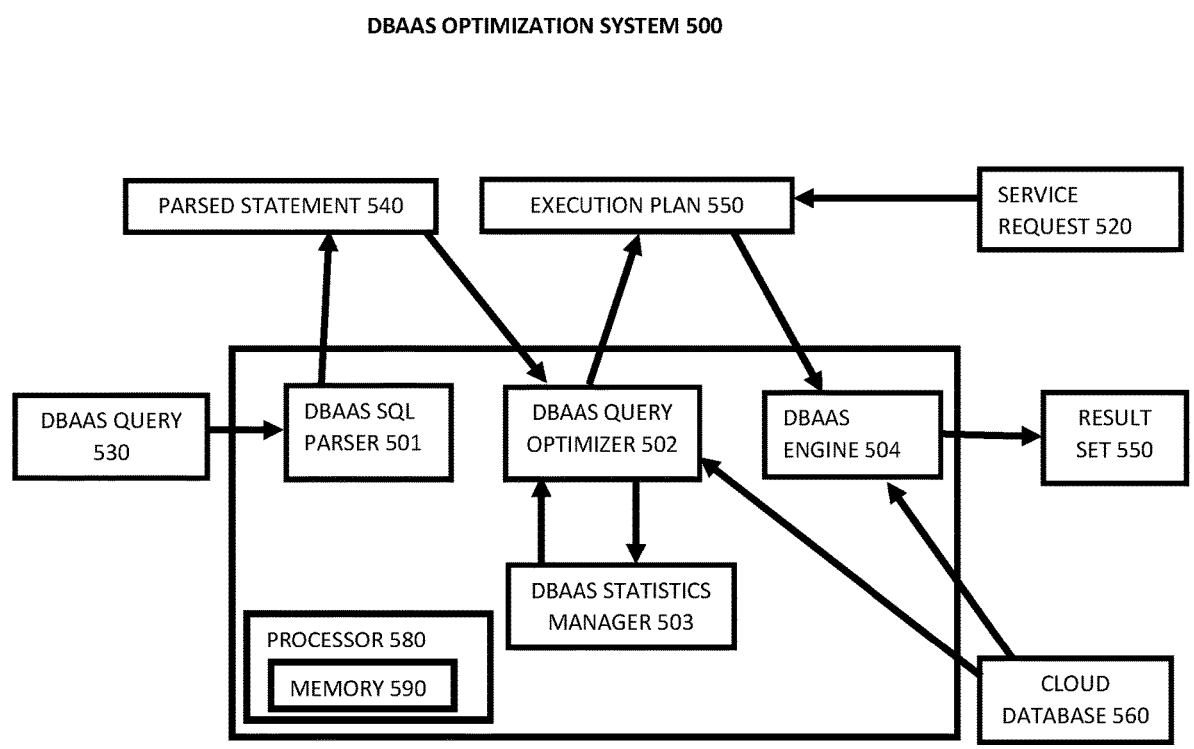
Figure 6:
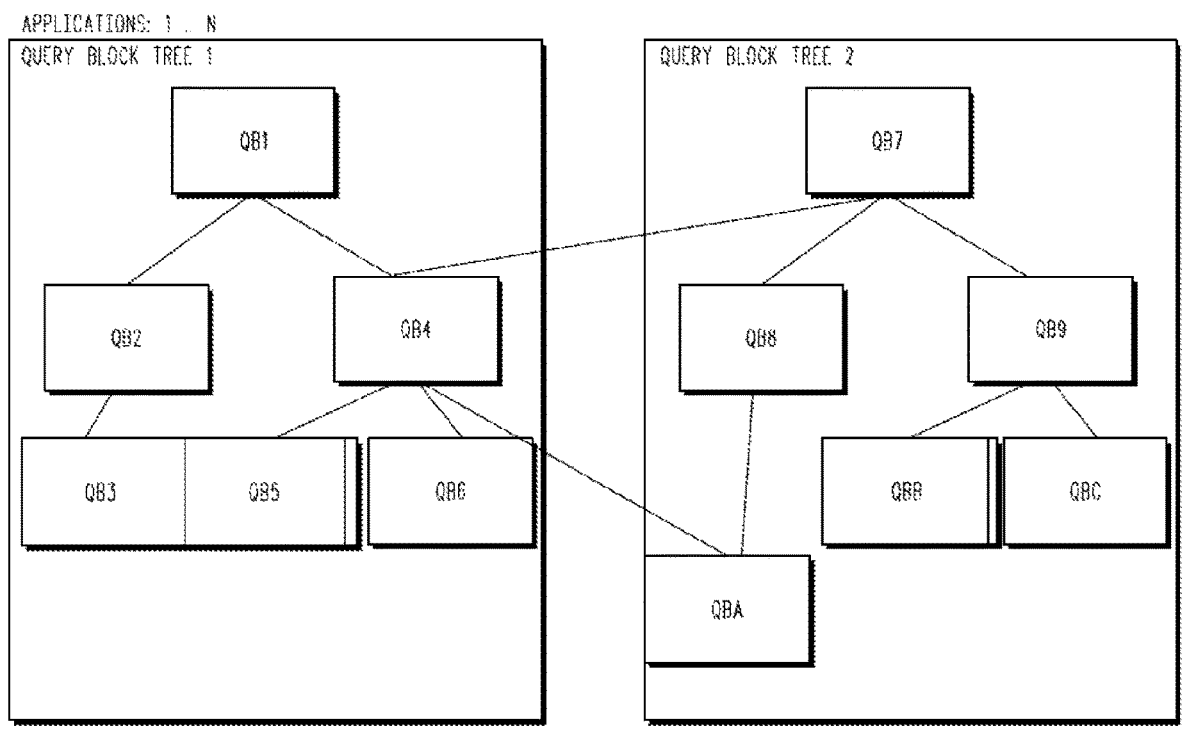
FIG. 6 exemplarily shows a query block tree 1 and a query block tree 2.

FIGS. 4-6 show a second embodiment for improving performance of Query Block trees for a Cloud database service (i.e., DBaaS—Database as a service).

That is, FIGS. 4-6 exemplarily show a method, system and program product which can provide optimization of database as a service queries of query blocks (QBs) of a query block tree in a cloud database environment. It is determined whether a query block of interest is part of a query block tree, having a number of query blocks sharing at least one root query block in common, with query blocks of the query block tree each having a plurality of queries executable by a plurality of resources. If the query block is part of the query block tree, it must be determined whether one or more subsequent QBs of the query blocks have greater than a predetermined probability of being executed subsequent to execution of the query block. For one or more subsequent QBs determined to have greater than the predetermined probability of being executed subsequent to execution of the query block, one or more operational threshold values of system resources are adjusted to increase execution speed of subsequently executed queries so as to yield an expected run time of the one or more subsequent QBs when executed that is faster than a default run time of the one or more subsequent QBs if the one or more operational threshold values were not adjusted.

Thus, the expected run times of DBaaS QBs can be used by the DBaaS optimizer to generate goals for a set of QBs contained in a QB Tree(s). By watching the order of QB runs, a tree can be built out of observed QB runs. From this information, the worst/average/best case runtimes of higher level applications can be learned by looking at various targets or goals. Statistics can be tracked on the various QBs of a QB Tree and the likelihood of different paths through the QB Tree can be learned. Thus, at a given point of the three, decisions can be made about setting future QB operational thresholds.

FIG. 4 shows a high level flow chart for a method of optimization of database as a service queries of query blocks of a query block tree in a cloud database environment.

It is noted that prior to Step 401, there is an incoming request, the incoming request is compiled to create a DBaaS Query which is then parsed. The parsed DBaaS query is then optimized. Following this, for a query block of interest that is part of a query block tree having a plurality of query blocks having at least one root query block in common, Step 401 determines one or more subsequent QBs having greater than a predetermined probability of being executed subsequent to execution of the query block.

For the one or more subsequent QBs having greater than the predetermined probability of being executed subsequent to execution of the query block, Step 402 adjusts one or more operational threshold values of a plurality of resources to increase execution speed of subsequently executed queries of the one or more subsequent QBs so as to yield an expected run time of the one or more subsequent QBs that when executed, is faster than a default run time of the one or more subsequent QBs if the one or more operation threshold values were not adjusted.

Step 403 executes the one or more subsequent QBs in accordance with the adjusted one or more operation threshold values of the plurality of resources.

Step 404 captures an actual run time of the one or more subsequent QBs when executed.

Step 405 determines if the captured run time is less than or approximately equal to the target run time.

If Step 405 determines NO, then Step 406 adjusts the one or more operational threshold values of the plurality of resources to yield an improved expected run time of the one or more subsequent QBs when executed that is at least as fast as the target run time. The improved expected run time is faster than the expected run time.

If Step 405 determines YES, then the method skips Step 405 and proceeds to Step 407.

Step 407 updates the historical execution data of the one or more subsequent QBs to generate an updated expected run time of the one or more subsequent QBs in accordance with the adjusted one or more operation threshold values of the plurality of resources.

Step 408 compiles historical execution data of the one or more subsequent QBs to generate the expected run time of the one or more subsequent QBs of the query block tree.

Step 409 restores the one or more adjusted operational threshold values of the plurality of resources to pre-adjusted values.

Step 410 determines an updated probability of each query block of the plurality of query blocks having greater than the predetermined probability of being executed subsequent to execution of the query block to identify one or more updated subsequent QBs.

Following Step 410, the query execution is completed after performance optimization and the results are fetched and the requesting service is sent.

FIG. 6 exemplarily shows a result of a first query tree 1 having QBs and a second query tree 2 having QBs of the method of FIG. 4.

With reference now to FIG. 5, the DBaaS optimization system 100 includes a DBaaS SQL Parser 501, a DBaaS query optimizer 502, a DBaaS statistics manager 503, and a DBaaS engine 504. The DBaaS optimization system 100 includes a processor 180 and a memory 190, with the memory 190 storing instructions to cause the processor 180 to execute each circuit of performance management system 100. The processor and memory may be physical hardware components, or a combination of hardware and software components.

Although the performance management system 100 includes various devices, it should be noted that a performance management system can include modules in which the memory 190 stores instructions to cause the processor 180 to execute each module of performance management system 100.

Also, each of the devices can be a stand-alone circuit, unit, module, etc. that can be interconnected to cooperatively produce a transformation to a result.

In general, the DBaaS optimization system 500 receives the service request 520, compiles the incoming service request 520 and creates the DBaaS query 530. The DBaaS SQL parser 501 parses the DBaaS query 530 to output the parsed statement 540. The DBaaS query optimizer receives the parses statement 540 and optimizes the query conjunctively with the DBaaS statistics manager 503.

For ease of description and with reference to Steps 401 to 410, the DBaaS query optimizer 502 and the DBaaS statistics manager execute Step 401, the DBaaS engine 504 communicates with the cloud database 560 and the DBaaS statistics manager to execute Step 402. Then the DBaaS engine 504 executes Steps 403 and 404.

Step 405 is executed using the DBaaS engine 504 and then Step 406 is executed by the DBaaS engine 504, the DBaaS query optimizer 502, and the DBaaS statistics manager 503.

Step 407 is executed by the DBaaS engine 504, the DBaaS query optimizer 502, and the DBaaS statistics manager 503 followed by the DBaaS statistics manager executing step 503. The DBaaS engine 504 and the DBaaS query optimizer 502 then execute step 409.

The DBaaS engine 504, the DBaaS query optimizer 502, and the DBaaS statistics manager 503 executes step 410.

It is noted that multiple components of the DBaaS optimization system 500 conjunctively and cooperatively operate together to execute some of the steps of the method of FIG. 4.

After performance optimization and improvement is completed, the Query execution is completed and the result set 550 is output.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 7, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 8, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the performance management system 100 and the DBAAS optimization system 500 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A performance management system for a service for database as a service (DBaaS) in a cloud computing environment, the system comprising:

a receiving and comparing circuit configured to receive a service request from a user and compare the received service request to at least one prior received service request;

a similarity calculating circuit configured to calculate a similarity between the service request and the at least one prior received service request based on a requirement that the service request places on the DBaaS;

a data verifying circuit configured to verify whether information within the database of the DBaaS has changed since an identical prior received service request based on the receiving and comparing circuit identifying the identical prior received service request;

an overlap determining circuit configured to determine an overlap between data of the service request and the identical prior received service request that the data verifying circuit verifies the information within the database of the DBaaS has not changed;

a service analyzing circuit configured to analyze the service request to determine if a threshold value of the database of the DBaaS should be updated based on if the service request will be completed in the cloud computing environment outside of an expected run time, thereby creating an updated threshold value based on a result of the analyzing; and a database modifying circuit configured to modify the threshold value of the database of the DBaaS to the updated threshold value such that the service request is completed within the expected run time, wherein the updated threshold value is returned back to an unmodified threshold value when the expected run time is a target run time, wherein the updated threshold value is used for a future service request when the future service request is a match to the service request having the updated threshold value, wherein the updated threshold value is returned back to the unmodified threshold value, and resources tied up with the updated threshold value are released, and wherein the updated threshold value is used for the future service request prior to a run time of the future service request.

2. The system of claim 1, further comprising a learning circuit configured to learn and store a modification to the threshold value by the database modifying circuit.

3. The system of claim 2, wherein the database modifying circuit modifies the threshold value to be a same modification as previously performed by the database modifying circuit based on the similarity calculating circuit identifying a second previous service request and the learning circuit storing the threshold modification for the second previous service request.

4. The system of claim 1, wherein the receiving and comparing circuit compares the service request to the at least one prior received service request to identify if a part of the at least one prior received service request is identical to a part of the service request.

5. The system of claim 2, wherein the similarity calculating circuit predicts the threshold value modification based on a stored threshold value modification.

6. The system of claim 1, wherein the requirement includes at least one of:
- a same runtime to complete the service request;
- a percentage of memory used;
- if a temporary sparse index is needed, an amount of processor parallelism to be used;
- a length of time slice to be used;
- if the service request can cause an increase of task priority; and
- if the service request requires Local Predicate Generation (LPG).

7. The system of claim 1, wherein the similarity calculation circuit predicts a type of load that the service request will cause to the DBaaS based on a same at least one prior received service request.

8. The system of claim 2, wherein the similarity calculating circuit calculates if the service request requires a same modification to the threshold value of at least one previous service request based on the learned threshold values by the learning circuit.

9. The system of claim 8, wherein data of the service request is different than data of the at least one previous service request.

10. The system of claim 1, wherein the threshold value is based on at least one of:
- a threshold of when to create a temporary sparse index for the service request;
- a threshold of a percentage of memory used that triggers needing more memory for the service request;
- a threshold of an amount of processor parallelism to be used for the service request;
- a threshold of a length of time slice to be used for the service request;
- a threshold of when to increase a task priority for the service request;
- a threshold of when to use real time statistics for the service request;
- a threshold of when to kick in Local Predicate Generation (LPG) for the service request; and
- a threshold for when to allocate additional resources to speed up the service request.

11. A performance management method for a service for database as a service (DBaaS) in a cloud computing environment, the method comprising:
receiving a service request from a user;
comparing the received service request to at least one prior received service request;
calculating a similarity between the service request and the at least one prior service request based on a requirement that the service request places on the DBaaS;
verifying whether information within the database of the DBaaS has changed since an identical prior received service request based on the comparing identifying the identical prior received service request;
determining an overlap between data of the service request and the identical prior received service request if the verifying verifies that the information within the database of the DBaaS has not changed;
analyzing the service request to determine if a threshold value of the database of the DBaaS should be updated based on whether the service request will be completed in the cloud computing environment outside of an expected run time, thereby creating an updated threshold value based on a result of the analyzing; and
modifying the threshold value of the database of the DBaaS to the updated threshold value such that the service request is completed within the expected run time,
wherein the updated threshold value is returned back to an unmodified threshold value when the expected run time is a target run time,
wherein the updated threshold value is used for a future service request when the future service request is a match to the service request having the updated threshold value,
wherein the updated threshold value is returned back to the unmodified threshold value, and resources tied up with the updated threshold value are released, and
wherein the updated threshold value is used for the future service request prior to a run time of the future service request.

12. The method of claim 11, wherein the modifying modifies the threshold value to be a same modification as previously performed by the modifying based on the calculating the similarity identifying a second previous service request and the learning and storing the threshold modification for the second previous service request.

13. The method of claim 11, wherein the comparing compares the service request to the at least one prior received service requests to identify if a part of the prior received service request is identical to a part of the service request.

14. The method of claim 11, wherein the calculating the similarity predicts the threshold value modification based on a stored threshold value modification.

15. A non-transitory computer-readable recording medium recording a performance management program for a service for database as a service (DBaaS) in a cloud computing environment for performing the method of claim 11.

* * * * *